(12) United States Patent
Bozarth et al.

(10) Patent No.: US 9,170,318 B1
(45) Date of Patent: Oct. 27, 2015

(54) INTER-DEVICE LOCATION DETERMINATIONS

(71) Applicant: Amazon Technologies, Inc., Reno, NV (US)

(72) Inventors: Bradley J. Bozarth, Sunnyvale, CA (US); Isaac Scott Noble, Soquel, CA (US); Mingjing Huang, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 94 days.

(21) Appl. No.: 14/158,627

(22) Filed: Jan. 17, 2014

Related U.S. Application Data

(63) Continuation of application No. 12/893,930, filed on Sep. 29, 2010, now Pat. No. 8,634,848.

(51) Int. Cl.
H04W 24/00 (2009.01)
G01S 5/02 (2010.01)

(52) U.S. Cl.
CPC .................................. G01S 5/0284 (2013.01)

(58) Field of Classification Search
USPC ........ 455/556.1, 41.2, 456.1; 701/28; 356/3.1
See application file for complete search history.

(56) References Cited

U.S. PATENT DOCUMENTS

| | | | |
|---|---|---|---|
| 2004/0058729 A1* | 3/2004 | Shin-Pin | 463/25 |
| 2004/0264775 A1* | 12/2004 | Slobodin | 382/174 |
| 2005/0213082 A1* | 9/2005 | DiBernardo et al. | 356/139.03 |
| 2007/0112444 A1* | 5/2007 | Alberth et al. | 700/32 |
| 2008/0195863 A1* | 8/2008 | Kennedy | 713/168 |
| 2008/0214233 A1* | 9/2008 | Wilson et al. | 455/556.1 |
| 2009/0115971 A1* | 5/2009 | Shan et al. | 353/42 |
| 2009/0176451 A1* | 7/2009 | Yang et al. | 455/41.2 |
| 2009/0238238 A1* | 9/2009 | Hollander et al. | 374/121 |
| 2009/0239586 A1* | 9/2009 | Boeve et al. | 455/566 |
| 2010/0022220 A1* | 1/2010 | Gupta et al. | 455/412.2 |
| 2010/0035637 A1* | 2/2010 | Varanasi et al. | 455/457 |
| 2010/0088532 A1* | 4/2010 | Pollock et al. | 713/324 |
| 2010/0098325 A1* | 4/2010 | Barbier et al. | 382/154 |
| 2010/0099456 A1* | 4/2010 | Kim | 455/556.1 |
| 2010/0105325 A1* | 4/2010 | Halla et al. | 455/41.2 |
| 2010/0228421 A1* | 9/2010 | DiBernardo et al. | 701/28 |

\* cited by examiner

Primary Examiner — Nathan Taylor
(74) Attorney, Agent, or Firm — Novak Druce Connolly Bove + Quigg LLP

(57) ABSTRACT

Electronic devices can identify other nearby devices, and determine the relative positions of those devices, using a combination of techniques. Various devices are able to project one or more instances of a unique identifier, such as a barcode, which can be imaged by other devices. The devices also can communicate position and/or orientation information over a wireless sideband channel. By combining the information relating to the projected identifier with information collected over the sideband channel, devices can automatically determine the location of various devices and associate a user or device identity with those devices. A user of a device then can view relative locations of those devices on a display element, including information about the user of the device. Further, the relative position determinations can enable a user to perform certain functions with respect to another device based at least in part upon the position and/or identity of that device.

18 Claims, 13 Drawing Sheets

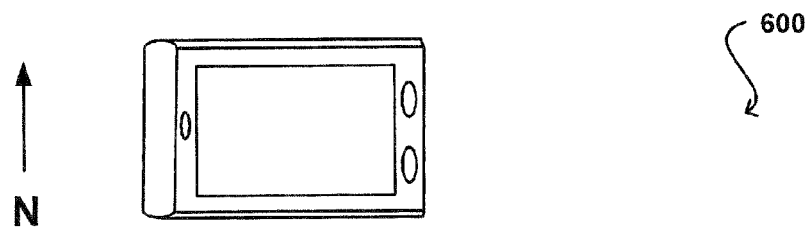
FIG. 6(a)
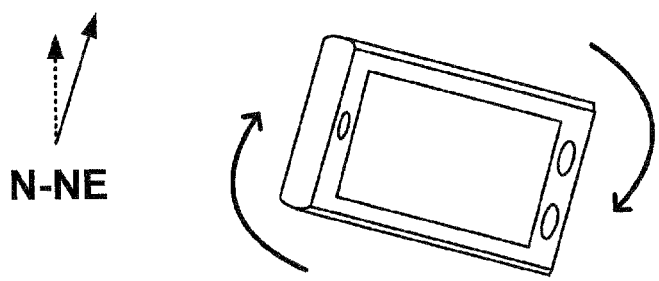
FIG. 6(b)
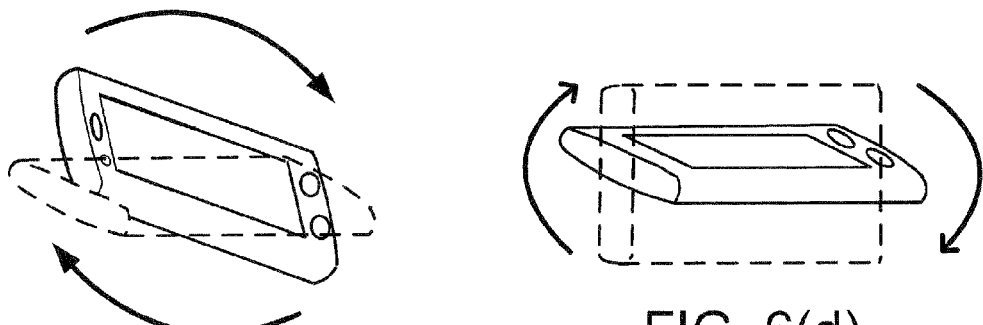
FIG. 6(c)
FIG. 6(d)
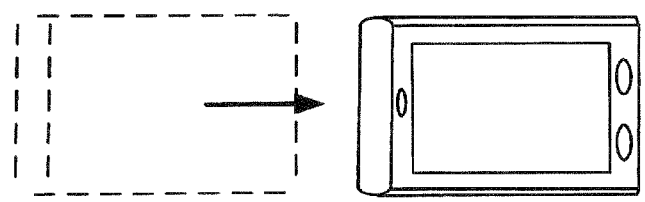
FIG. 6(e)

INTER-DEVICE LOCATION DETERMINATIONS

CROSS REFERENCE TO RELATED APPLICATION

This application is a Continuation of, and accordingly claims the benefit of, allowed U.S. patent application Ser. No. 12/893,930, filed with the U.S. Patent and Trademark Office on Sep. 29, 2010, which is hereby incorporated herein by reference.

BACKGROUND

In today's environment, there is an ever-increasing number of portable devices such as notebook computers, personal data assistants (PDAs), smart phones, portable media players, portable gaming devices and electronic book reading devices (e-book readers). While many of these devices provide for at least one type of network connection, such as a hardwire Internet connection, a Wi-Fi connection, a 3G or other type of wireless connection, etc., there often is not an easy way to identify other users or devices, as well as to share information or concurrently access specific content using multiple devices. For example, a first user viewing a document on a conventional e-book reader cannot easily share the document with a second user on a second e-book reader. In many cases, the first user would have to tell the second user about the document and the second user would have to navigate an interface on the second device to locate the document and then download the document to that device. In another example, a first user of a smart phone playing a game would have to tell a second user of another smart phone the address or location for accessing the game, which the second user would then have to manually enter in order to navigate to that game. In some cases, the first user would also have to obtain the identity of the second smart device and manually allow that device to join the game. There is no simple way for users of electronic devices within a given range or distance of each other to automatically share identity and relative location information, enabling those devices to communicate and share information or concurrently access various types of content.

BRIEF DESCRIPTION OF THE DRAWINGS

Various embodiments in accordance with the present disclosure will be described with reference to the drawings, in which:

FIGS. 6(a)-(e) illustrate different types of device movement or orientation that can be used for various determinations in accordance with various embodiments;

DETAILED DESCRIPTION

Figure 1A:
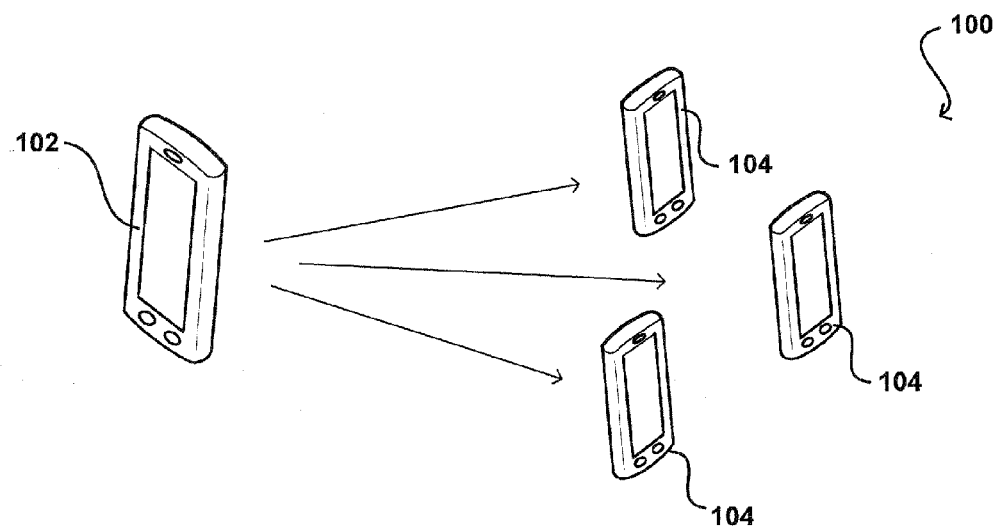
FIG. 1(a) illustrates an example configuration of devices wherein devices are able to at least partially view each other.

Systems and methods in accordance with various embodiments of the present disclosure overcome one or more of the above-referenced and other deficiencies in conventional approaches to interfacing between multiple devices. In particular, various embodiments provide the ability for an electronic device to determine the relative position of other devices in a vicinity of the electronic device, and in many cases establish a communication channel with those devices. The mechanisms used for such determinations can vary based upon a number of different factors, such as the environment surrounding the devices as well as the type(s) and/or capabilities of those devices.

In various embodiments, devices are able to project an image including information identifying the respective device. For example, an electronic device can project a barcode or other identifier using infrared light that is not detectable to human users. Other devices in the vicinity can capture an image of the projected barcode using an infrared sensor, wide-band camera, or other such device. The captured image can be analyzed, such as by using an appropriate image analysis algorithm, and identifying information can be extracted that can convey the identity of the projecting device or a user of that device. Further, based on the shape of the barcode in the captured image, the capturing device can determine a relative location of the projecting device. In many embodiments, devices can function as both a projecting device and an imaging device, either concurrently or at different times.

In many cases, the devices also can communicate information using what is referred to herein as a "sideband channel," which typically is a wireless communication mechanism including technologies such as Bluetooth®, radio frequency (RF) transmissions, IR signaling, Wi-Fi, and/or other such communication technologies. One particular embodiment utilizes ultra-wideband (UWB) radio technology, which enables communication over a large range of the radio spectrum with very low energy consumption for short-range high-bandwidth communications. In addition to high bandwidth capability, UWB also has high immunity to other RF signals (e.g., Wi-Fi, Bluetooth), and enables extremely tight time synchronization. Additionally, UWB provides another data point, particularly a non-line of sight distance between devices. UWB includes fairly accurate ranging to provide a measure of distance to a communicating device, although direction is generally not provided unless the UWB approach is combined with another approach.

If a projecting device sends information over the sideband channel, the imaging device can correlate the information with the position of the projecting device in order to quickly determine which device in the room corresponds to communications over a particular sideband channel, enabling a user of the imaging device to associate a location and/or user with a particular communication, even if those devices have not previously communicated or established identity information. Using such information, a user can communicate with a specific device by viewing a relative position of the specific device on a display of the imaging device, and selecting the device in that relative location to which to send a communication. Many other such uses are described and suggested below with respect to the various embodiments.

In order to facilitate the determination of relative position of a projecting device by an imaging device, various devices can also communicate other types of information over the sideband channel. For example, an imaging device can receive position and/or orientation about the projecting device that can assist in determining a relative position and/or orientation of the projecting device with respect to the imaging device.

In various embodiments, a device can include at least one position-determining element, such as a global positioning system (GPS), triangulation mechanism, or other such component. If the position information is sufficiently accurate, the devices in some embodiments can rely on this information alone. In many cases, however, the position information is not sufficiently accurate for multiple devices in a room or similar environment, where devices might only be separated by a couple of feet and/or the physical structure of the room might prevent an accurate determination. In such cases, it can be desirable to combine the position data with the analyzed image data to assist in determining position.

In various embodiments, devices can include an electronic compass or similar element operable to determine a geographic direction in which a particular axis of the device is facing. Such information can be useful when there are two or more devices in essentially the same area, such that their relative position might not easily be discerned using only image or position information, but each device is facing in at least a slightly different direction. For example, if one projecting device is facing in a northeast direction, and another device is facing in a northwest direction, then the imaging device should be able to correlate the identifier in each respective projected image based on a relative position and/or orientation of the projected images, based on the relative directions of the projecting devices.

Similarly, in various embodiments devices can include at least one orientation-determining element, such as an accelerometer or gyroscope, which can convey information such as whether the device is positioned flat (e.g., on a table), standing on one end, etc. Two devices might be positioned side by side and both pointing in essentially the same direction, but based on their respective orientations the devices might be projecting images in substantially different directions. The availability of the orientation information can assist with determining which projected image corresponds with which device.

An additional benefit of elements such as accelerometers is that they can assist in tracking relative movement of the devices. In some embodiments, at least some of the above processes can occur periodically in order to update the relative location of various devices as those locations change. In other embodiments, the relative positions can be updated using the accelerometer data. Accelerometer data can provide a relatively accurate movement determination. Once the relative positions of the devices have been determined, this information can be used to track movement of a respective device, which can be transmitted over the sideband channel. In some embodiments, one or more other processes can be used periodically to ensure an accurate relative position determination, but the majority of the tracking can rely upon accelerometer or similar movement data.

In some embodiments, different approaches can be used based on various environmental factors, configurations, device capabilities, or other such factors. For example, a line of sight to a single projected image from any of multiple devices to an imaging device still might be obscured, or images from multiple devices might overlap. In some cases, the devices can project multiple images in multiple locations, can take turns projecting the images, or can project an image at specific times as may be communicated over the sideband channel. In some cases, however, the images still might not be able to be detected, such as where there is no suitable surface for accurately reflecting the images. In such eases, one or more of the above described or other such processes can be used to attempt to determine relative positions and/or orientations of the various devices.

Knowing the relative position and/or location of various devices also can be used for many other purposes. For example, such information can enable the devices to be used as gaming controllers where the position and/or orientation can be used as input to a video game. Such information also allows users to share information such as pictures or messages with users of specific devices, without having to set up a dedicated communications channel or exchange information such as email addresses. Further, knowing an identity of each device in the room as well as the relative position can enable a device to display name and other information for a user of each device in the room, which can be useful in meetings or other situations where the user of the device might not otherwise know or remember the name of each person, etc. Various other uses are described and suggested below within the scope of the various embodiments.

FIG. 1(a) illustrates an example situation 100 wherein a first device 102 is within a detectable range of three other devices 104 with a clear line of sight. As used herein, "detectable range" refers to a distance over which a device can detect another device, using an appropriate technique among those discussed or suggested herein, including but not limited to: visual detection using an imaging device, camera, or sensor; audio detection using a microphone or other audio capture device; or a data signal transmitted via Wi-Fi, Bluetooth®, or another wireless transmission mechanism as known or subsequently developed in the art for such purposes. In this particular example, the first device 102 uses an image capture element, such as a camera or infrared detector, to attempt to determine the presence and/or relative position of each second device 104. Since the first device has a substantially clear line of sight to each second device, the first device can capture one or more images of the devices and, through image analysis or a similar mechanism, determine aspects such as the relative location, orientation, and other such information, as well as potentially determining something about the device, such as an identity if there is a bar code on the device, the user can be recognized, or some other identification information can be readily obtained. Other examples and further information on such an approach, as well as uses for such an approach, can be found, for example, in co-pending U.S. patent application Ser. No. 12/331,894, filed Dec. 10, 2008, entitled "Content Sharing via Coded. Communications," which is hereby incorporated herein by reference.

Figure 1B:
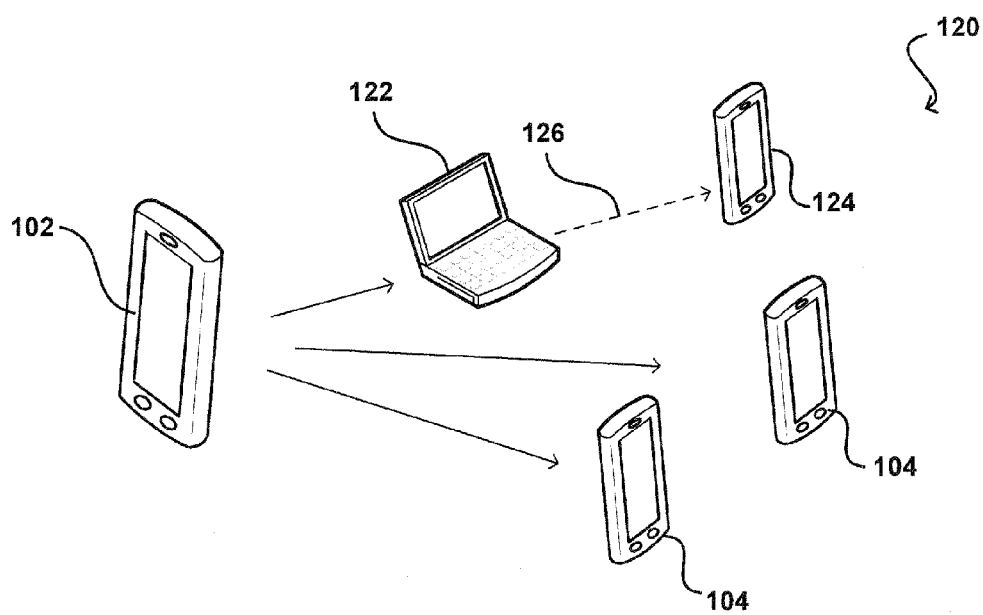
FIG. 1(b) illustrates an example configuration of devices wherein at least two devices are substantially unable to view each other.

FIG. 1(b) illustrates an example situation 120 wherein attempting to make such determinations can be problematic. In this situation, the first device 102 is substantially unable to view one of the second devices 124 because there is another device 122 obstructing the visual path 126 between the first and second devices. While this is a simple example, it can easily be understood that in a location such as a conference room or classroom there can be people, devices, and other objects in the room that can prevent devices from having a clear visual path to each other. Thus, an approach such as that described with respect to FIG. 1(a) that relies on a substantially unobstructed view between devices can be unreliable in many situations.

Figure 1C:
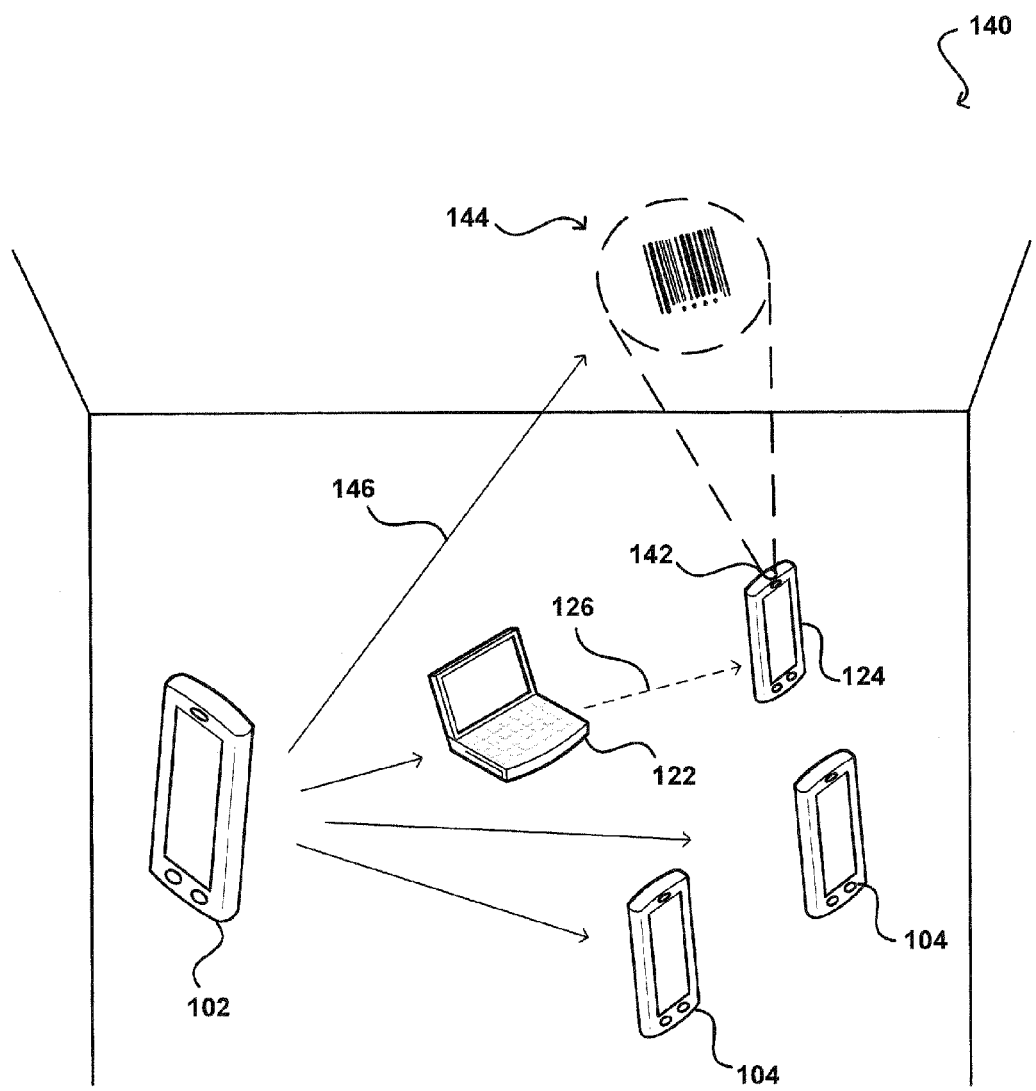
FIG. 1(c) illustrates an example configuration of devices including projection and/or imaging capabilities that can be used in accordance with various embodiments.

FIG. 1(c) illustrates a similar situation to that of FIG. 1(b), wherein a device 122 obstructs the visual path 126 between a first device 102 and a second device 124. In this situation, however, at least one of the devices (here the second device—referred to hereinafter as the "projecting device") has the ability to project an identifier 144 in such a way that a camera, sensor, or detector of the first device 102 (hereinafter referred to as the "imaging device") can detect the projected identifier 144. In various embodiments, a projection element 142 of the projecting device 124 is operable to project at least one image, such as a full color, black and white, or infrared image, in at least one direction with respect to the device. The image 144 can be any appropriate image, such as a bar code, unique symbol, or alphanumeric identifier. The identifier can provide identification information for the user and/or the projecting device. In this example, the projector is positioned at a "top" of a portable device such that when a user is holding the portable device during typical use the projector will be able to project the image substantially above the portable device. If in a room with a ceiling, for example, the image can be projected on the ceiling. It should be understood that the projector could be in any appropriate location on the device and can be removable, and in some instances the device can have multiple projection elements that can each simultaneously, or alternatively, project the identifying image. In some embodiments, the projection element used to project the element can depend at least in part upon an orientation of the device, the detection of an appropriate reflective surface, or another such aspect.

An advantage to projecting an identifier on the ceiling, or a similar location, is that the first device 102 might not be able to view the second device 124, but typically will be able to view an image 144 projected on the ceiling of the room, for example. In some cases, the projection can include multiple instances of the identifier, separated a distance apart, in order to improve the likelihood that the first device 102 will actually be able to capture an image of at least one instance of the projected identifier. In other embodiments, the projected identifier can change position, such as by moving across the ceiling or appearing in different locations, in order to improve the likelihood of viewing by the first device. The projection of the identifier can be continuous, random, or periodic in time, and in some cases might no longer be projected once the location and identity of the second device 124 have been determined by the first device 102. Several other approaches are possible as well within the scope of the various embodiments.

Figure 2:
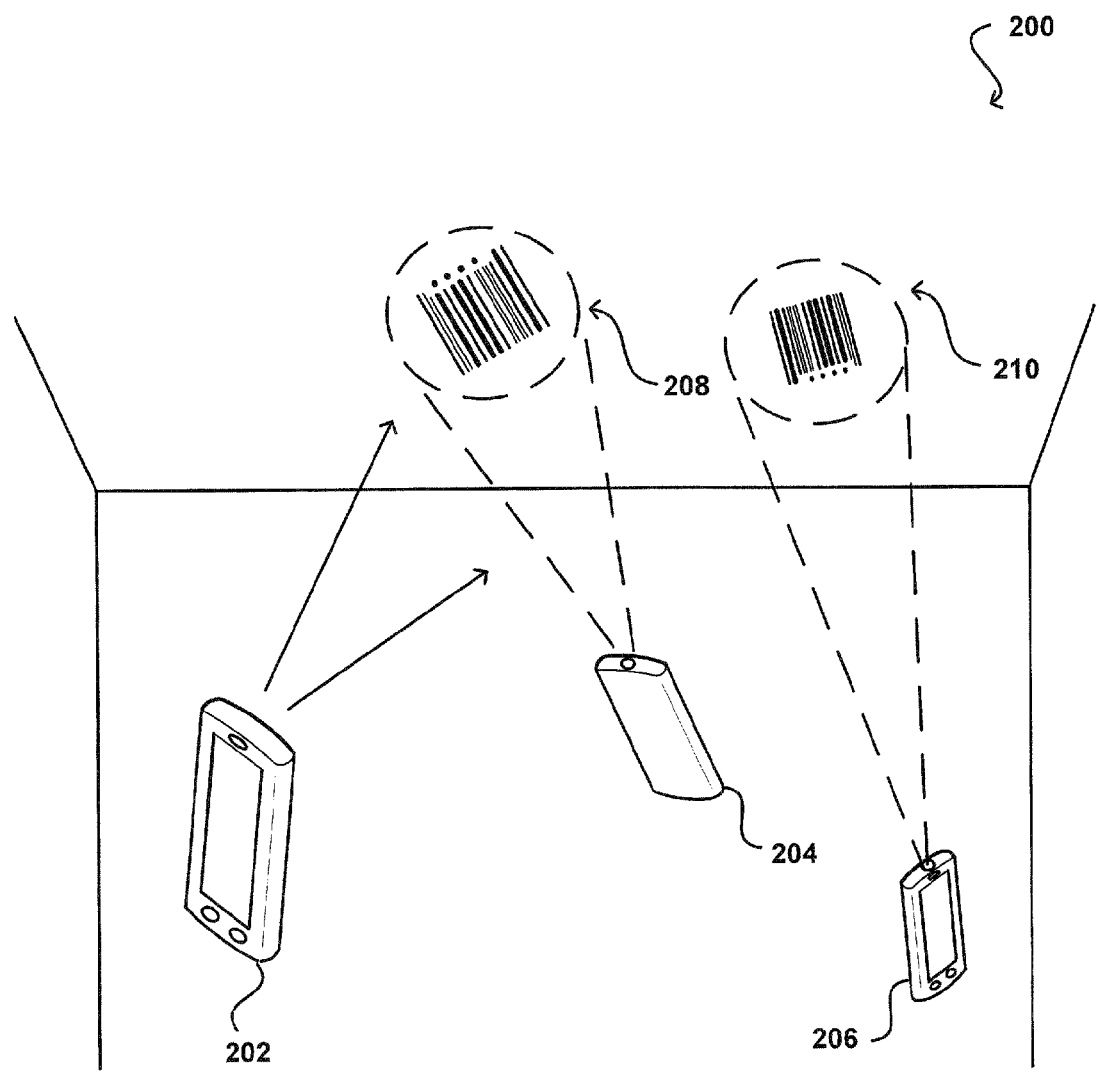
FIG. 2 illustrates an example configuration of devices including projection and/or imaging capabilities that can be used in accordance with various embodiments.

As illustrated in the example configuration 200 of FIG. 2, multiple devices 204, 206 can each project an identifier 208, 210 that can be detected by another device 202. The identifiers 208, 210 can be broadcast concurrently or at different times, as may be determined via communications between the various devices. In other embodiments, the devices can broadcast at varying time intervals, or at varying locations, in an attempt to prevent the identifier from being obscured by another identifier from another device for at least some instances of the broadcast. In this example, there can be a "master" device 202 selected that detects the location and identity of each other nearby device 204, 206, and upon determining a relative position and/or orientation of each device can transmit that information back to the other devices via a sideband or other such data channel. In other embodiments, each device might broadcast an identifier, and each device can attempt to determine the relative location and/or orientation of the other devices. The information then can be shared among the devices in order to improve the precision of the determinations. For example, a mapping can be generated that can be shared among the devices in various embodiments.

Figure 3:
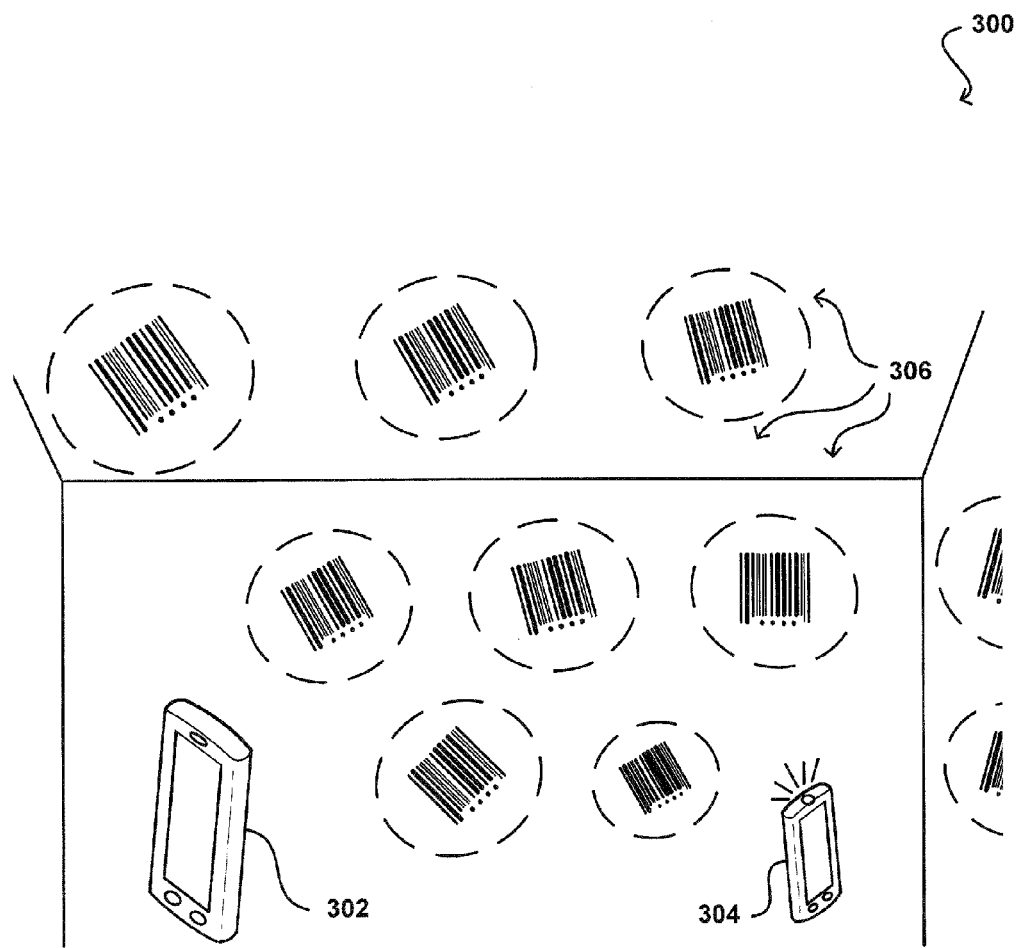
FIG. 3 illustrates an example configuration wherein a device is able to project multiple identifiers that can be used in accordance with various embodiments.

FIG. 3 illustrates an example situation 300 wherein the projecting device 304 is able to concurrently project multiple instances of the device identifier 306. In this example, the device can have a projector with a lens enabling a hemisphere of instances to be projected simultaneously, which then can be reflected from the ceiling, walls, or various objects of other surfaces in the room, or in the surrounding area. It should be understood, however, that in other embodiments a device could project a radially redundant large image, or utilize another such approach. Such a projection approach can improve the likelihood that the imaging device 302 will be able to image and analyze at least one of those instances. In other cases, the device might have a moveable projector lens assembly, multiple element assembly, or other such mechanism for projecting the identifier 306 to multiple locations at concurrent or different times. Any other suitable approach for projecting multiple instances of an identifier can be used as well as should be apparent in light of the teachings and suggestions contained herein. Projecting multiple instances can decrease the likelihood that all of the projections from a device will be obscured by a pattern from another device, whether those instances are separated in space and/or time. In some embodiments there are large gaps between instances such that even if the projections from another device occur and substantially the same time there will be a lesser likelihood of overlap. Other approaches such as periodic, random, or controlled flashing can be used by devices to prevent the codes from being obscured. For example, in a meeting situation the devices can communicate and select to take turns flashing identifiers on rotating 10 ms intervals.

Figure 4:
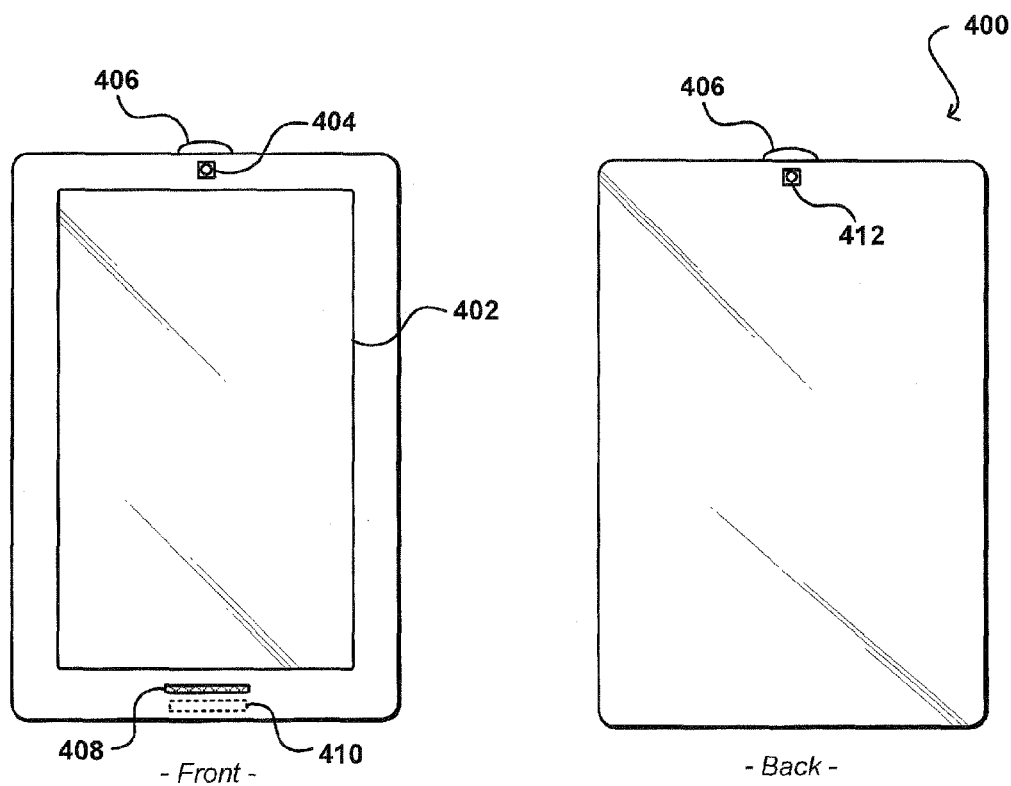
FIG. 4 illustrates front and back views of an example device that can be used in accordance with various embodiments.

FIG. 4 illustrates front and back views, respectively, of an example computing device 400 that can be used in accordance with various embodiments. Although a portable computing device (e.g., an electronic book reader or tablet computer) is shown, it should be understood that any electronic device capable of receiving and processing input can be used in accordance with various embodiments discussed herein, where the devices can include, for example, desktop computers, notebook computers, personal data assistants, smart phones, video gaming consoles, television set top boxes, and portable media players. In this example, the computing device 400 has a display screen 402 on the front side, which under normal operation will display information to a user facing the display screen (e.g., on the same side of the computing device as the display screen). The computing device in this example includes a front image capture element 404 and a back image capture element 412 positioned on the device such that, with sufficient wide angle lenses or other such optics, the computing device 400 is able to capture image information in substantially any direction about the computing device. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 400 also includes at least one projection element 406 positioned so as to be able to project one or more images from the device during normal operation orientation(s). In this example there is a single projection element 406 on a top surface of the device ("top" being used as an example in the figure and not as an orientation requirement) able to project images on a ceiling and surrounding surfaces, for example, while in other embodiments there can be multiple projection elements positioned around the device 400. The projection element can include any appropriate components, such as an infrared laser diode and a static identifier filter, enabling the projection element to project the unique device identifier at any time without interfering with the human user of the device. In other embodiments, the projection element can include a standard full-color projection source or other such device, and can include any appropriate optical elements such as shutters, focusing lenses, and wide-angle lenses. The static identifier filter can be formed using any appropriate process, such as printing or stamping into a film or other layer of material, etc. A stamped identifier, for example, could take the form of a unique diffraction grating for each device, a 120-bit alphanumeric code, etc.

The example computing device 400 also includes a microphone 408 or other audio capture device capable of capturing audio data, such as words spoken by a user of the device. In this example, a microphone 408 is placed on the same side of the device as the display screen 402, such that the microphone will typically be better able to capture words spoken by a user of the device. In at least some embodiments, the microphone can be a directional microphone that captures sound information from substantially directly in front of the device, and picks up only a limited amount of sound from other directions, which can help to better capture words spoken by a primary user of the device.

The example computing device 400 also includes at least one position and/or orientation determining element 410. Such an element can include, for example, an accelerometer or gyroscope operable to detect an orientation and/or change in orientation of the computing device 400. An orientation determining element also can include an electronic or digital compass, which can indicate a direction (e.g., north or south) in which the device is determined to be pointing (e.g., with respect to a primary axis or other such aspect). A location determining element also can include or comprise a global positioning system (GPS) or similar positioning element operable to determine relative coordinates for a position of the computing device. Various embodiments can include one or more such elements in any appropriate combination. As should be understood, the algorithms or mechanisms used for determining relative position and/or orientation can depend at least in part upon the selection of elements available to the device.

Figure 5:
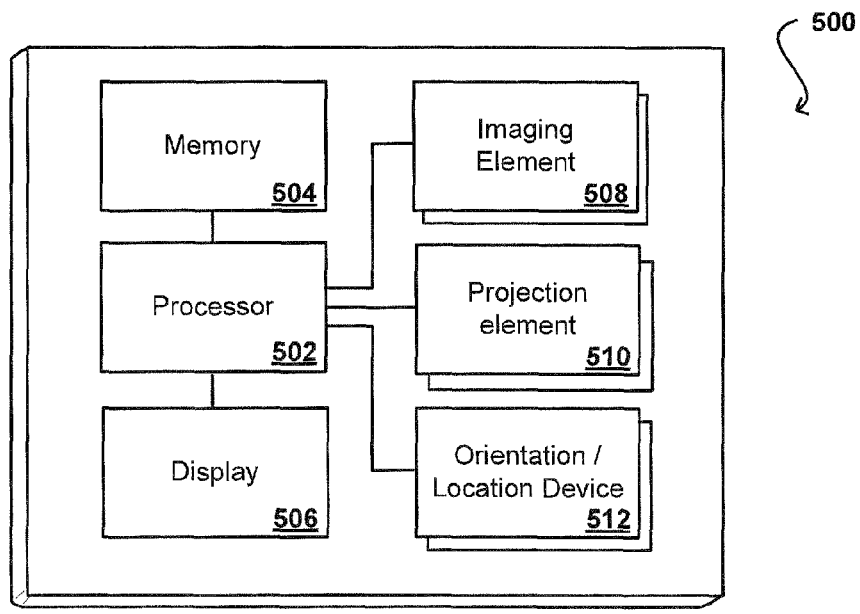
FIG. 5 illustrates example components of a device that can be used in accordance with various embodiments.

FIG. 5 illustrates a logical arrangement of a set of general components of an example computing device 500 such as the device 400 described with respect to FIG. 4. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one image capture element 508 such as a camera or infrared sensor that is able to image projected image or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

As discussed, the device also can include at least one projection element 510, such as an infrared laser diode embedded in, or external to, the computing device. The projection element can include any appropriate optical elements that can be substantially uni-directional or omni-directional in nature. The device also can include one or more orientation and/or location determining elements 512, such as an accelerometer, gyroscope, electronic compass, or GPS device. These elements can be in communication with the processor in order to provide the processor with positioning and/or orientation data.

In some embodiments, the computing device 500 of FIG. 5 can include one or more sideband communication elements (not shown), such as a Wi-Fi, Bluetooth, RF, or other wireless communication system. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

FIGS. 6(*a*)-6(*e*) illustrate example types of information that can be obtained using location and/or orientation determining elements of an example device 600 in accordance with various embodiments. For example, FIG. 6(a) illustrates that the device is facing substantially north (according to a selected or defined axis of the device), while FIG. 6(b) illustrates that the device has been adjusted in direction such that the device is now facing in a north-northeast direction. The change in direction, as well as the number of degrees or other measurement of the change, can be determined using an element such as an electronic compass. FIGS. 6(c) and 6(d) illustrate changes in orientation (e.g., tilted to the side and back, respectively) that do not change the direction and thus would might be picked up as a direction change by a compass. Such changes in orientation can be picked up by an orientation determining element such as an accelerometer or gyroscope. FIG. 6(e) illustrates a change in the position of the device. While such motion can be picked up by an element such as an accelerometer, an element such as a GPS device can give more accurate and/or precise location information for a current position of the device in at least some situations. Various other types of elements can be used as well to obtain any of these and other changes in orientation and/or location. As discussed above, these and/or other such determinations can be combined with the projected image information to determine aspects such as the identity and relative position of various devices.

As discussed elsewhere herein, the orientation and/or position information obtained from the device over the sideband can help not only to distinguish between devices, but also to help determine the distance to various devices. For example, two devices might be sufficiently near each other that their relative positions cannot be distinguished based on the projected images alone (i.e., the reverse mappings from the projected images point to substantially the same location, within a margin of error). If the relative orientation of the devices is known, however, the imaging device can correlate each device with its projected identifier based at least in part upon where the identifier is projected and the reported orientation of each device, as the orientation will affect where the identifier is projected. Further, the distance determination can be improved by sending orientation information over the sideband. The basic imaging/projection approach can assume, in at least some embodiments, that the ceiling or surface upon which the identifier is being projected, is at a particular angle or orientation with respect to the imaging device. If the surface is at an angle, however, the reverse mapping may give an incorrect result. By knowing the orientation of the projecting device, the imaging device can better determine the location of the projecting device based upon the captured image. Other information such as GPS data can be used to adjust the position determinations as well, as should be apparent in light of the present disclosure.

In at least some embodiments, combinations of approaches can be used to attempt to determine a measure of distance and directionality between each pair of devices. A radio signal might be able to provide a measure of distance, at least with respect to the relative distances of multiple devices. In some embodiments, each device can broadcast on a different frequency such that multiple determinations can be made substantially concurrently by scanning over those frequencies. GPS coordinates can make a relatively accurate distance and/or direction determination, if available and sufficiently accurate. The projected identifier can assist in obtaining the direction and/or act as an additional distance determination mechanism. Many embodiments will not attempt to determine absolute position, but relative position with respect to a particular device. The device name, user name, and/or other such information then can be associated with a device at a particular relative position.

Figure 7A:
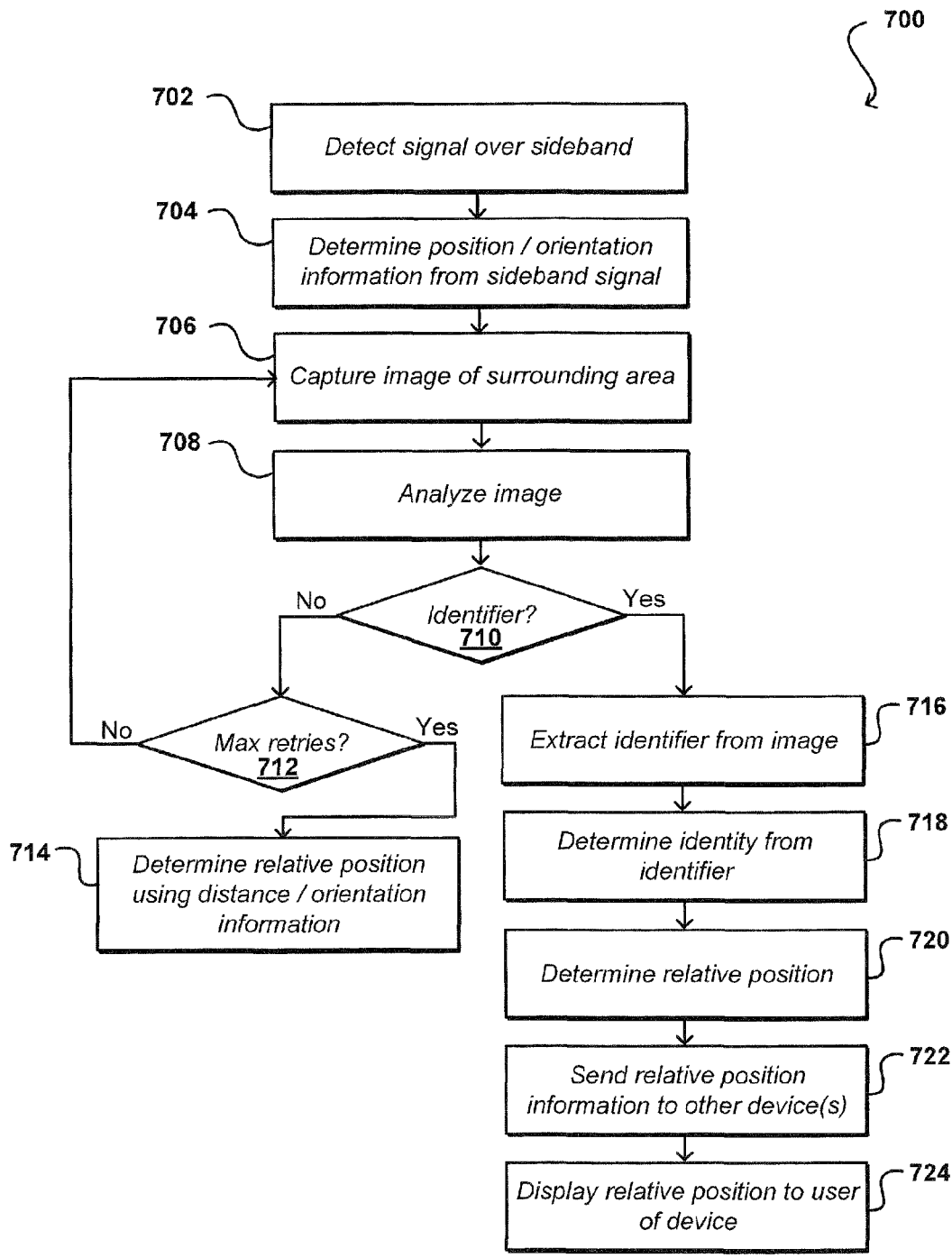
FIGS. 7(a)-(b) illustrate an example process for determining relative location and/or orientation between devices that can be used in accordance with various embodiments.
Figure 7B:
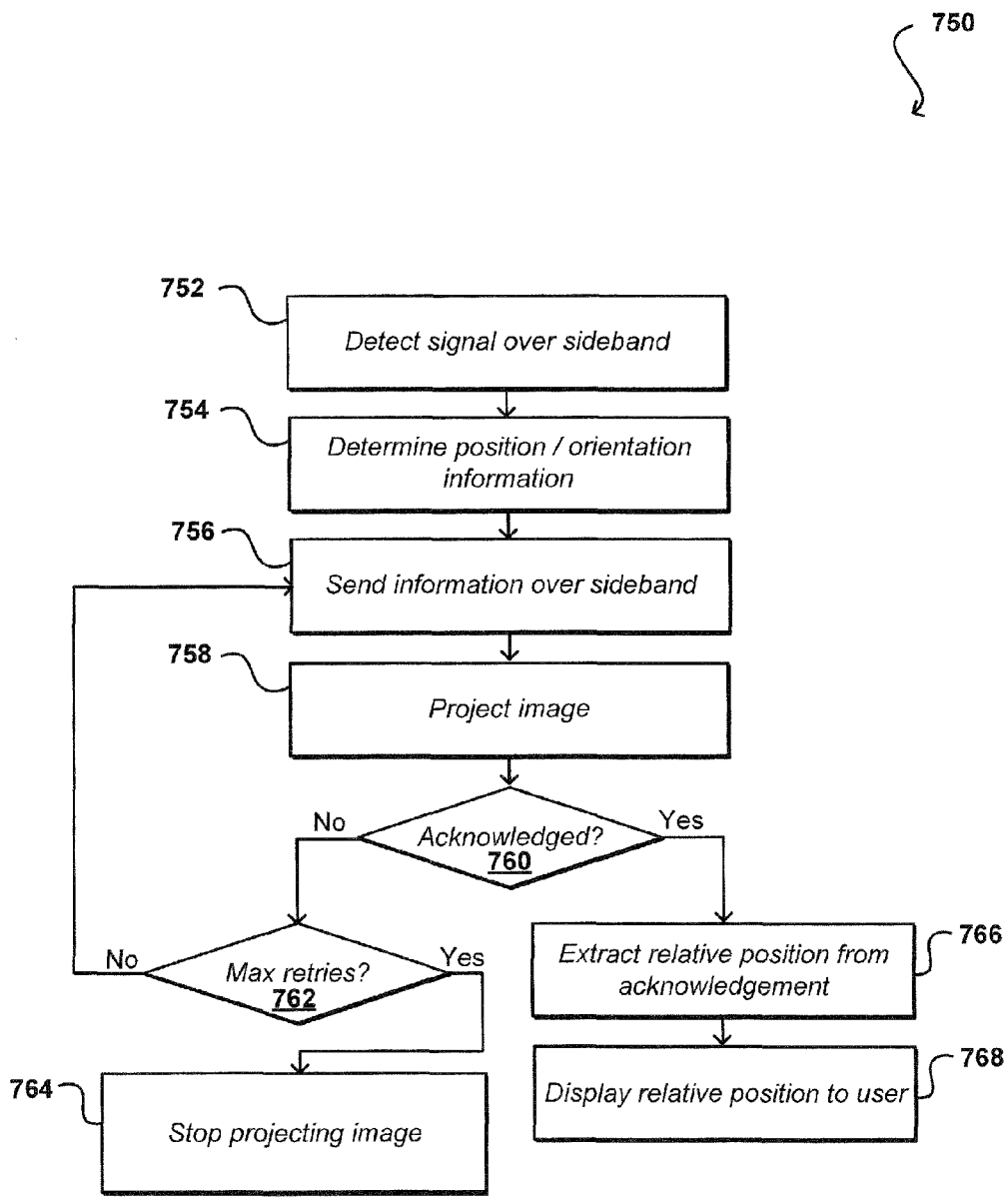

FIGS. 7(a) and 7(b) illustrate an example process for determining the location and identity of a nearby device that can be used in accordance with various embodiments. It should be understood that other information can be determined as well, and that the process can be used to determine information for multiple devices as discussed elsewhere herein. Further, it should be understood for the various processes discussed herein that there can be additional, fewer, or alternative steps performed in similar or alternative orders, or in parallel, within the scope of the various embodiments unless otherwise stated.

FIG. 7(a) illustrates a portion 700 of the example process performed by an imaging device. In this example, the imaging device detects the presence of another device over the sideband 702. This could comprise, for example, detecting the presence of another device while monitoring for devices operable to communicate over a Bluetooth or Wi-Fi channel. As part of the initial signal receipt or from a subsequent signal from a detected device, position and/or orientation information can be extracted from the signal for that device 704. As discussed elsewhere herein, the position and/or orientation information can pertain to aspects of the projected image (as may be measured by a projection system) and/or aspects of the orientation of the broadcasting device (as may be measured by internal sensors or other elements such as an accelerometer, gyroscope, electronic compass, etc.), each of which can assist in analyzing the projected image. The imaging device also can, at or near the same time, capture at least one image of the surrounding area 706, using a camera, infrared sensor, or other such element. It should be understood that while the term "image" is used herein for simplicity of explanation, the device can capture any appropriate type of information indicative of a projected identifier or other such element. The imaging device can analyze the captured image(s), using at least one image analysis algorithm, to attempt to detect the presence of a projected device identifier 708. A determination is made as to whether the captured image(s) likely contains a device identifier 710. If not, a determination is made as to whether a maximum number (or period) of retries has been reached 712. If the maximum number of retries has not been reached, the imaging device can capture another image for analysis. As discussed elsewhere herein, the two devices can communicate over the sideband in order to coordinate the projection and image capture processes. If the maximum number of retries has been reached, the imaging device (or another device in communication therewith) can attempt to determine the relative position based on the distance and/or orientation information transmitted over the sideband channel 714, or can request other information over the sideband channel to assist with the determination. As discussed elsewhere herein, the device also can attempt to utilize another approach to obtain additional information.

If a device identifier is determined to likely be contained within a captured image, the device can extract the identifier 716 from the image (or at least determine a region within the image containing the identifier). The device (or user) ID (or other information) can be determined from the identifier using one or more image analysis or optical character recognition algorithms 718. The imaging device also can determine the relative location of the identified device based on aspects of the imaged identifier and/or the position and/or orientation information obtained over the sideband channel 720. Once determined, the imaging device can send the relative position information to the projecting device (and any other appropriate nearby device communicating with the imaging device) 722. The imaging device also can indicate the relative position of the identified device on a display element (or other such indicator) or the imaging device 724.

FIG. 7(b) illustrates a portion 750 of the example process from the perspective of the projecting device, as can be used in accordance with various embodiments. In this portion, the projecting device detects the presence of the imaging device over the sideband channel 752, similar to the process discussed above. Upon detecting the imaging device, the projecting device determines current position and/or orientation information 754, and sends that information to the imaging device over the sideband channel 756. In some embodiments, the information is alternatively broadcast or heartbeated at specific intervals regardless of the detection of another device, and other approaches can be used as well. The projecting device can also, concurrently or at an appropriate time, project at least one image containing the identifier for the device (or user) 758. The projection can be done using any appropriate approach discussed or suggested herein. If the projecting device does not receive an acknowledgement signal from the projecting device within a determined period of time 760, and the maximum number of retries has not yet occurred 762, then the projecting device can again project the identifier. If the maximum retries have occurred, then the device can stop projecting 764, and another approach can be utilized as discussed elsewhere herein. If an acknowledgement is received, the relative position information and imaging device identity can be extracted from the acknowledgement (or a subsequent message) and stored on the projecting device 766. If appropriate, the projecting device can also display the relative position of the imaging device on a display element of the projecting device 768.

Figure 8:
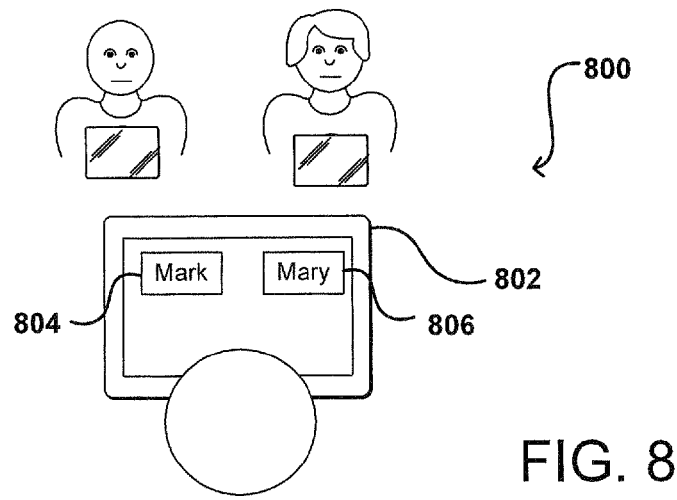
FIG. 8 illustrates an example display of icons for located devices that can be used in accordance with various embodiments.

As discussed above, determining the relative locations and identities of other devices and/or users can enable the devices to offer a wide variety of functionality and/or otherwise utilize the location and identity information can be utilized in a number of different ways. For example, FIG. 8 illustrates an example configuration 800 wherein a first user device 802 has detected the presence of two other devices nearby, and has determined an identity associated with each device using an approach discussed herein. In this example, a display on the device 802 can display an icon 804, 806 for each detected device, along with identity information for each device. In this example, each icon has associated with it the name of the current user of that device. Also as can be seen, the relative position of each icon on the display is representative of the relative position of each of those devices with respect to the first user device 802. If the position of either device changes, that change in relative position can be tracked, and the position of the associated icon of the screen can be updated to reflect the change. The icons can enable a user of the first device 804 to quickly determine the identity of each user and select any of those user devices for a specific action, such as to send content to a particular user, invite the user to join a game, coordinate display information, or perform any of a number of other such functions. Further description and additional examples of other such uses can be found, for example, in co-pending U.S. patent application Ser. No. 12/331,894, filed Dec. 10, 2008, entitled "Content Sharing via Coded Communications," incorporated by reference above. In general, such an approach easily enables users to share content such as presentations or music playlists, as well as various types of documents, meeting schedules, contact information, Web pages, or any other type of information that a user may desire to share with others or otherwise transfer to other devices. Such an approach also enables a user to quickly obtain identifying information for users in a nearby area, which can be useful in settings such as meetings or presentations as the user can obtain the names and occupations, or other such information, about each person, which can be helpful when networking or otherwise conversing with those persons.

In some instances, however, not all of the approaches discussed above will work in locating the relative positions of specific devices. For example, it may be difficult to locate and/or analyze images projected by nearby devices due at least in part to the surrounding surfaces onto which the images are projected. If a group of users meet outside then there might be no nearby ceiling, walls, or other reasonably flat surface upon which to project an image. While the images might be projected onto people, trees, or other such objects, the irregular shapes of these objects can prevent an image analysis algorithm from correctly analyzing a given identifier. In such cases, devices in accordance with various embodiments can attempt to utilize at least a second relative location determination approach. In some embodiments, this secondary approach can be used after a period of attempting a projection-based determination, or can be activated manually by at least one user of the nearby devices. In other embodiments, an input might trigger the use of a secondary determination, such as a light sensor detecting an amount of light consistent with outdoor use or a sonic sensor not receiving reflected sonic waves consistent with an enclosure or at least a relatively flat surface. Any of a number of other determinations can be used as well. In some embodiments, multiple approaches can be used concurrently, with as many reliable results as possible being combined in order to attempt to develop an accurate mapping of nearby devices.

Figure 9:
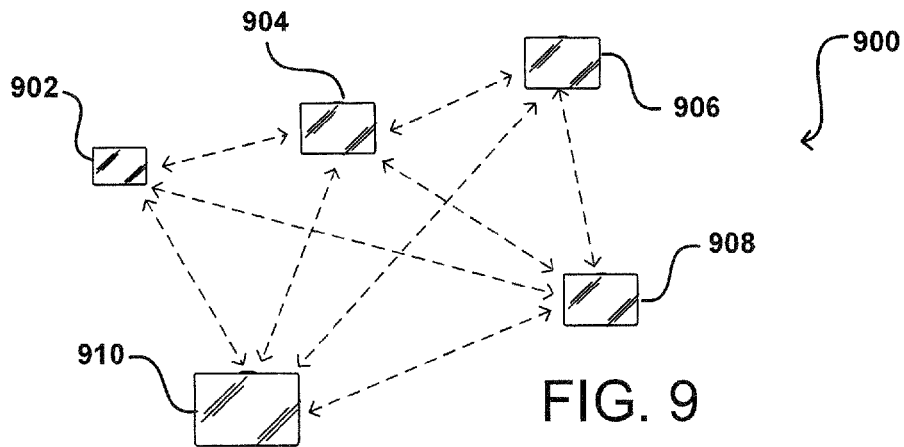
FIG. 9 illustrates an example approach to determining a relative location and orientation of devices that can be used in accordance with various embodiments.

FIG. 9 illustrates an example configuration 900 of devices outdoors (or otherwise in a location without appropriate surfaces for projection and imaging), where devices 904, 908, and 910 have a clear visual path to all devices, but devices 902 and 906 do not have a clear path between them. In such a situation, direct visual detection approaches discussed above will not work because there is no clear line of sight between each device, and a projection approach will not work because there is no suitable surface for a projection. Approaches in accordance with various embodiments can combine inputs and/or determinations from various devices in order to generate a relative mapping of all devices. For example, in FIG. 9 image information captured from device 904 can be combined with image information captured from device 902 in order to generate for device 902 a relative mapping of all devices, including device 906 which cannot be imaged by device 902. If device 904 can determine the relative position of device 906 with respect to device 904, and device 902 and/or 904 can determine the relative position of device 902 with respect to device 904, then combining this information also give the relative position of devices 902 and 904. Using such an approach, a full mapping can be generated for nearby devices as long as each device is able to determine a relative position of at least one other device, and there is at least one viewing "path" by which all the devices can be connected (i.e., if there are four devices then there cannot be two groups of two devices where the devices in each group can only see each other—at least one of these devices therefore must be able to see two of the devices).

In another example, instead of (or in addition to) imaging nearby devices, each of the devices in FIG. 9 can send a signal that is detected by at least one other device, such that based on time of flight the devices can determine relative distances to each other. As known in the art, the amount of time it takes a signal to reach another device is indicative of the distance to that other device, which can be determined by knowing the speed of the signal in the transmission medium. When combining distance information for a number of devices, such as five devices as shown in FIG. 9, the relative distances between the devices can be combined and used to generate a relative position mapping using an appropriate distance determination algorithm (i.e., the distance paths between the various devices as shown in the figure can only be combined in one way, ignoring mirroring or rotation). If an input such as a compass or a relative position from an image can be pulled from at least one device, the mapping accuracy can be improved and may require fewer devices to generate an accurate mapping.

Figure 10:
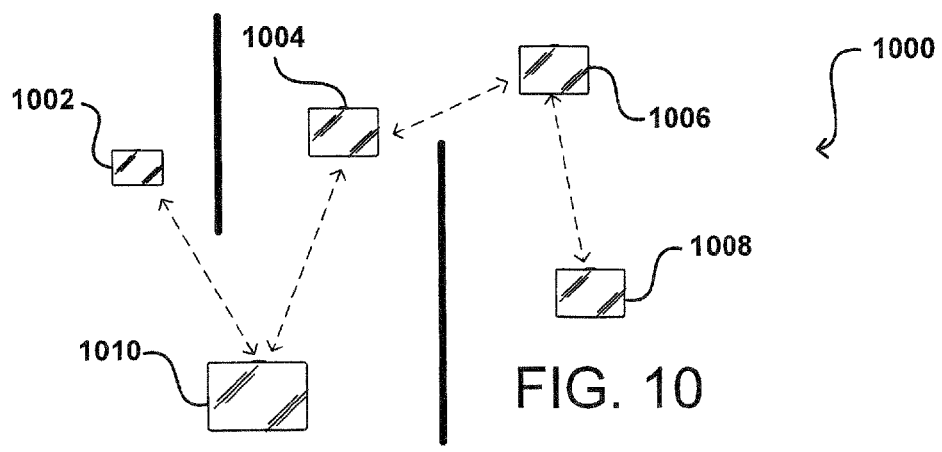
FIG. 10 illustrates an example approach to determining a relative location and orientation of devices that can be used in accordance with various embodiments.

In the example configuration 1000 of FIG. 10, there are five devices, but each device has at most an unobstructed path to one or two of the devices. By using information such as the direction of each device combined with the relative distance to at least one other device using an approach discussed herein, the information from the five devices can be combined, such as by sending data over an appropriate sideband channel, in order to generate a mapping of all the devices. For such an approach to work in at least some embodiments, at least one device has to have a clear path to at least two of the devices as discussed previously. Communication or location determination along the paths can use any appropriate technique discussed herein, such as image analysis, IR signaling, time-of-flight determination, etc. In some embodiments, the devices can emit tones that are at frequencies that cannot be detected by humans, for purposes of determining distance via time-of-flight calculations.

In some situations, however, there might be at least one device that does not have a clear path to any of the other devices. For example, consider in FIG. 10 that device 1006 is not a computing device that is able to communicate using techniques discussed herein, but is another type of device or an object that is not a computing device at all. In this situation, device 1008 would not be able to see any of the other devices 1002, 1004, 1010. In this case, however, both device 1004 and 1008 are able to image the object 1006, and thus can determine the relative orientation between each respective device and the object. Similar to the approach discussed above, if device 1004 can determine its relative orientation to the object, and device 1008 can also determine its relative orientation to the object, then devices 1004 and 1008 can determine their relative positions with respect to each other. For example, one device can indicate that it is about 10 degrees west and approximately 7 feet away from a particular user's face. By communicating information over the sideband, device 1008 then can get a relative positional mapping of each of the other devices, even though device 1008 cannot see any of those devices. Such an approach can be extended as well, such that if multiple devices can each view one or more objects, those devices can figure out their relative positions with respect to each other based on their relative positions with respect to those objects.

Figure 11:
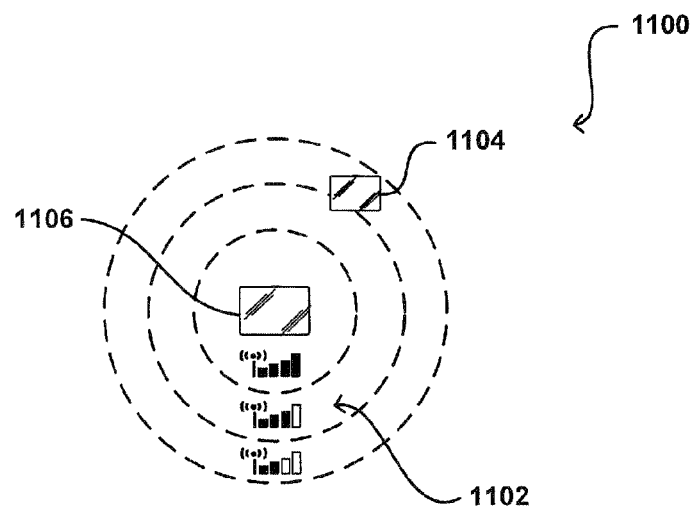
FIG. 11 illustrates an example approach to determining a relative distance between devices that can be used in accordance with various embodiments.

Various other approaches can be used as well to assist in determining aspects of the relative spatial relationship between two or more devices. These approaches can be used in addition to other approaches discussed herein, as alternative approaches, and/or when other approaches are not available. For example, a device might not have a projector or infrared capability, but might be a conventional cellular phone or similar device that includes a camera and Bluetooth technology. Such a situation can be described with respect to the example situation 1100 of FIG. 11. In this example, a first device 1106 is able to image and determine the approximate direction of a second device 1104 using a camera of the first device. While a captured image also can give an estimate of distance between the devices, such an estimate requires a relatively accurate knowledge of the actual size of the other device. In one approach to improving this distance determination, the first device 1106 can utilize a signal strength determination to attempt to determine an approximate distance to the second device 1104. For example, an RF signal will drop off in intensity such that at different distances there will be different signal strengths detected by another device. In the example of FIG. 11, different signal strength ranges are categorized into different categories, such as "bars" of signal strength, with each bar representing a level of strength over a given distance range from the device. For example, if the devices are right next to each other then the device might detect five bars out of five, corresponding to a strong signal, and when the devices are at the edge of the detectable range, the device might detect one bar out of five, corresponding to a weak signal. Based on the number of bars of signal strength between the two, a device can determine an approximate distance between the devices (within the given range).

For embodiments where signal strength can be determined on a more granular level, a device might be able to correlate the signal strength to a more accurate determination, such as where the range of signal drops off linearly over one hundred feet and, a 50% signal strength is detected, then the device can calculate that the other device is approximately fifty feet away. The accuracy of such a determination can be affected by a number of factors, however, such as the accuracy of the signal strength value used for either device, any interference or other factors, etc.

Figure 12:
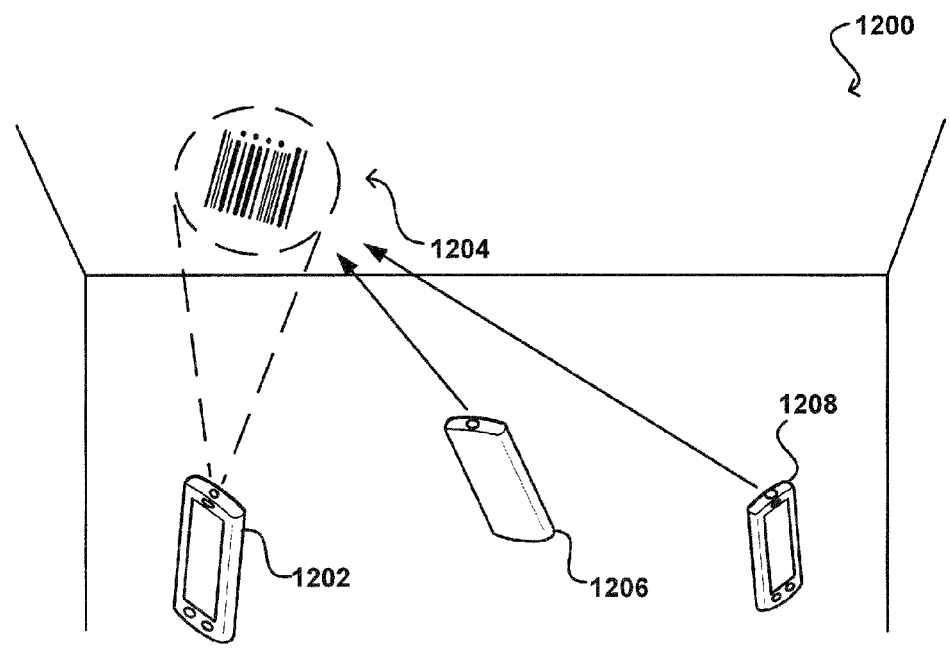
FIG. 12 illustrates an example approach to determining a relative location and orientation of devices that can be used in accordance with various embodiments.

FIG. 12 illustrates an example situation 1200 wherein only one device, such as a master device, projects an image onto a ceiling or other suitable surface using any of the various approaches discussed herein. Each secondary device 1206, 1208 is able to see the projected identifier 1204. In this example, each secondary device detecting the image projected from the primary device 1202 can determine a relative position with respect to the primary device (using approaches discussed above). By combining the relative position information from each secondary device with respect to the primary device, a mapping can be generated reflecting the relative positions of each secondary device. In some embodiments, the primary device 1202 can have a floating or mechanical projection system that will generally project the image 1204 directly above the primary device 1202, or at some other determined relative position, such as where the surface is substantially flat and parallel to the projected image plane. Using such an approach can improve the accuracy of determination of relative position of each secondary device based upon the projection.

Figure 13:
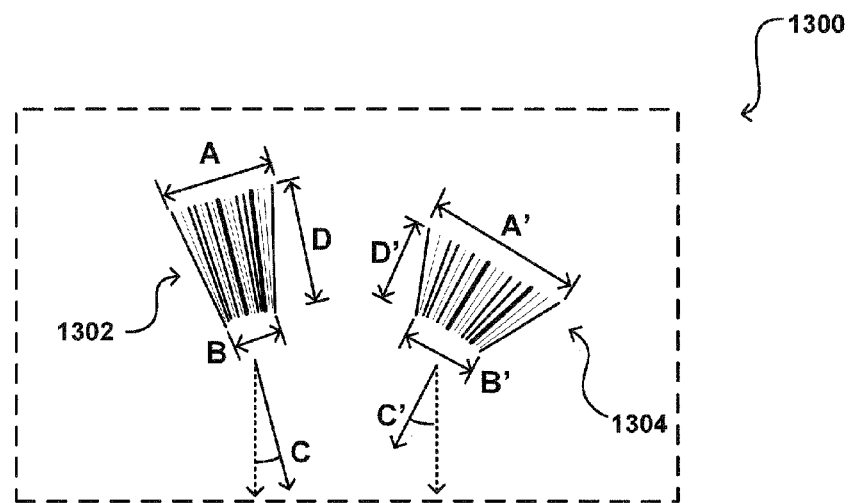
FIG. 13 illustrates an example approach to determining a relative location and orientation of devices that can be used in accordance with various embodiments.

As illustrated in the example captured image 1300 of FIG. 13, identifiers projected from different relative positions will appear differently in the captured image. For example, the first projected identifier 1302 appears tilted at an angle C. Using this angle, the device can determine a relative direction and/or orientation of the device projecting that identifier. In addition, a determined amount of "skew" of each identifier can be indicative of a distance to each device. For example, the difference between the width of the top edge of the pattern A and the bottom edge of the pattern B can be indicative of the relative separation and/or orientation of the devices. The difference between the ratio of the viewed width of the pattern A to the viewed height of the pattern D also can be indicative of the relative separation and/or orientation of the devices. If two devices are right next to each other, facing in substantially the same direction with a similar orientation, and the projection is directly up to an orthogonal surface, the detected difference between the widths at the top and the bottom (e.g., A and B) will be very small, if even detectable. As the separation between devices increases, or as the change in relative orientation increases, the difference between the detected widths will increase. Similarly, increases in the separation and or differences in orientation of the devices will change the ratio of the width of the design to the viewed height of the design ("D").

Similarly, the second imaged identifier 1304 has a specific tile angle C' and ratios of top width A', bottom width B', and height C'. Even if accurate distance and position determinations cannot be determined, the differences between the two identifiers in the image is indicative of a relative position of each of the projecting devices (not shown) with respect to the imaging device. In some embodiments, the projected identifiers have the same overall dimensions (e.g., the same height to width ratios) such that any variations in the detected height and/or width ratios, as well as a rotational direction of the image, can indicate at least a relative distance, direction, and/or orientation of the device projecting the image with respect to the device detecting the image. Using the ratio information, the imaging device can do a reverse mapping to determine an approximate relative location of each of the projecting devices.

Thus, in some embodiments, the "position and orientation" information sent over the sideband can relate to aspects of the projected image. For example, an imaging device can receive dimensions and orientation information for the image as projected by the projecting device, and can compare this information to the captured image of the projection as discussed with respect to FIG. 13 to determine the approximate location of the projecting device. In other embodiments, the "position and orientation" information sent over the sideband can alternatively, or additionally, relate to position and/or orientation aspects of the electronic device, as discussed elsewhere herein. Any orientation or similar information sent from the devices over Bluetooth or a similar sideband connection can assist in the mappings and location determinations. If each device projects multiple images or the same image at multiple locations, the determination can be even further improved due to the additional data points. A single image for each might not provide accurate relative position information in certain cases, however, such as where the surface upon which one image is projected is not substantially parallel and/or co-planar with an image from another device, such that differences in the captured image can be at least partially a reflection of the difference in surfaces.

Figure 14:
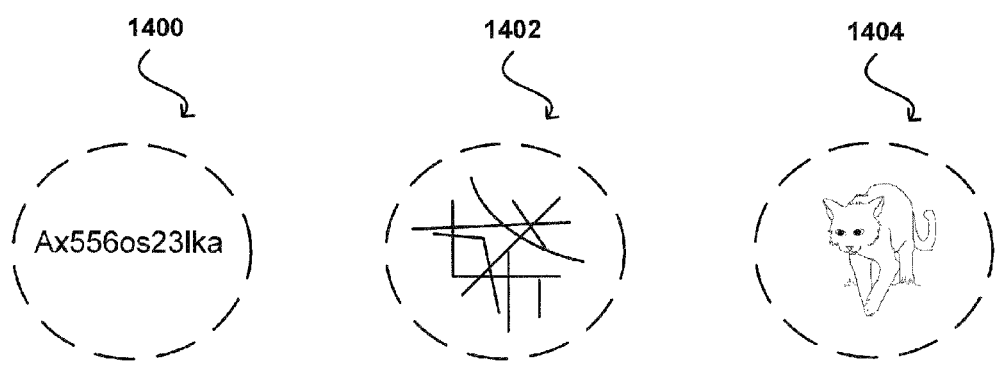
FIG. 14 illustrates a example identifiers that can be used in accordance with various embodiments.

It also should be stated that, while many of the examples above can utilize one-, two-, or three-dimensional bar codes as identifiers indicating an identity of each user and/or device, or other such information, it should be understood that any appropriate image and/or information can be projected or otherwise presented as well within the scope of the various embodiments. For example, FIG. 14 illustrates a first example wherein a device is able to broadcast an alphanumeric identifier 1400, such as a device ID, which can be imaged by surrounding devices and analyzed, using an appropriate image analysis and/or optical character recognition (OCR) algorithm, to determine the identity of the projecting device and/or user. In a second example, a device is able to project a unique symbol 1402 or other unique element that can be mapped directly to that device, and that in some embodiments can also contain information about the device. In some cases, fine lines or letters in barcodes or text can be blurred or difficult to read or resolve when imaged by an element such as an infrared sensor of a device. By using a unique symbol where the position, orientation, shape, length, and other such aspects of each line, portion, or other component of the symbol can convey data, such that the identity of the device can be determined by analyzing the components of the symbol, even without access to an identity mapping. The use of such designs can allow for information to be conveyed in a way that is more easily resolved that other approaches. Other identifiers such as QR codes or code matrices and be used as well.

It also should be understood that any of a number of other images or information conveying mechanisms can be used as well within the scope of the various embodiments. In one embodiment, an owner of a device is able to select an image 1404 to be used to uniquely identify the device. The owner can upload a copy of the image to a central service, for example, which can indicate whether the device is sufficiently unique to distinguish the device from others. If so, the image can be stored by the service and mapped to the device (or user). When another device captures that projected image, the image can be uploaded to the service which then can return the matching identity information. Various other approaches can be used as well as should be apparent.

In some embodiments, the projection can actually convey different information over time. For example, an image could be animated or at least change at certain intervals, which would allow any other device capturing the image to determine additional information. For example, in addition to device identity the projected image could include coordinates of the projecting device, orientation information, or any other type of information that might otherwise be broadcast over a side channel. A device can utilize encoded flashing wherein this and/or other information is alternatively conveyed in the projected image. In some cases, the image can include specific information requested by another user or device, etc. The ability to convey information in a number of different ways enables approaches discussed herein to work with devices that might not contain one or more devices or elements enabling the devices to practice certain methods.

Other approaches can be used for identifying devices and or users in accordance with various embodiments. For example, a device can use image recognition to determine the identity of a user, and match that user and location with information communicated on the sideband. Similarly, other approaches such as voice or speech recognition, biometric determinations (e.g., retinal scanning or heat signatures), and other such approaches can be used to determine identities and associate information with position in accordance with various embodiments. Information correlating a user with a particular device or identifier can be obtained from an appropriate service, central data store, or other appropriate location. In some cases, the information can be stored on the devices themselves, and if necessary can be communicated over the sideband as well.

In some embodiments, devices can attempt to utilize a first approach to determine relative location information, and after a number of attempts of period of attempted determination can switch over to another approach. In some embodiments, devices can attempt various combinations or types of determinations until at least some determination is made or until each available approach has been attempted, etc. For example, two devices might attempt to determine relative position using a projected image. If the imaging device is unable to detect the projected image, the devices might switch roles and the other device might attempt to broadcast an image, which might be in a different location, etc. If neither approach works, the devices might attempt to image a common object in order to make relative location determinations. If no common object can be located, other approaches such as time of flight can be used where available. In some embodiments the choices can be made dynamically based upon the capabilities of the devices, as may be transmitted over one or more sideband channels, while in other embodiments the choices can be made by users or other appropriate entities. In some embodiments, the choice might be made based at least in part upon environmental factors. For example, a light detector might be used to determine the amount of surrounding light, which might prevent conventional imaging from being used if there is a certain amount of light. A sonic range element might prevent an image from being broadcast if sound is not reflected by a substantially flat surface in a particular direction and/or particular range. Other variations can be used as well as should be apparent.

Some embodiments also provide for other types of inter-device interaction. For example, each device might utilize a specific line-of-sight signaling approach, such as an infrared (IR) beacon that is emitted by a device using a fisheye or other wide angle lens. While the beacon must be directly visible in at least some embodiments, the wide angle lens improves the detectability range of the beacon. In one approach, a set of devices can communicate over the sideband in order to coordinate and implement a synchronized round robin scheme to distinguish each flashing beacon and the corresponding device. In another approach, a repeated, binary encoded identifier ("ID"), which can be at least somewhat similar to morse code in implementation, can eliminate various time synchronization requirements.

In some embodiments, a device can provide a beacon using one or more 760 nm IR LEDs, along with a narrow bandpass filter to view only light substantially around the 760 nm wavelength. Such an approach can greatly ease the task of finding the beacon within an image. Such a frequency can also reduce interference from sunlight, as there is a significant dip in the measured intensity of sunlight at Earth's surface due in part to oxygen in the atmosphere absorbing light at, and around, that wavelength. Such wavelengths also can significantly reduce the detection of ambient light noise in images as well.

Figure 15:
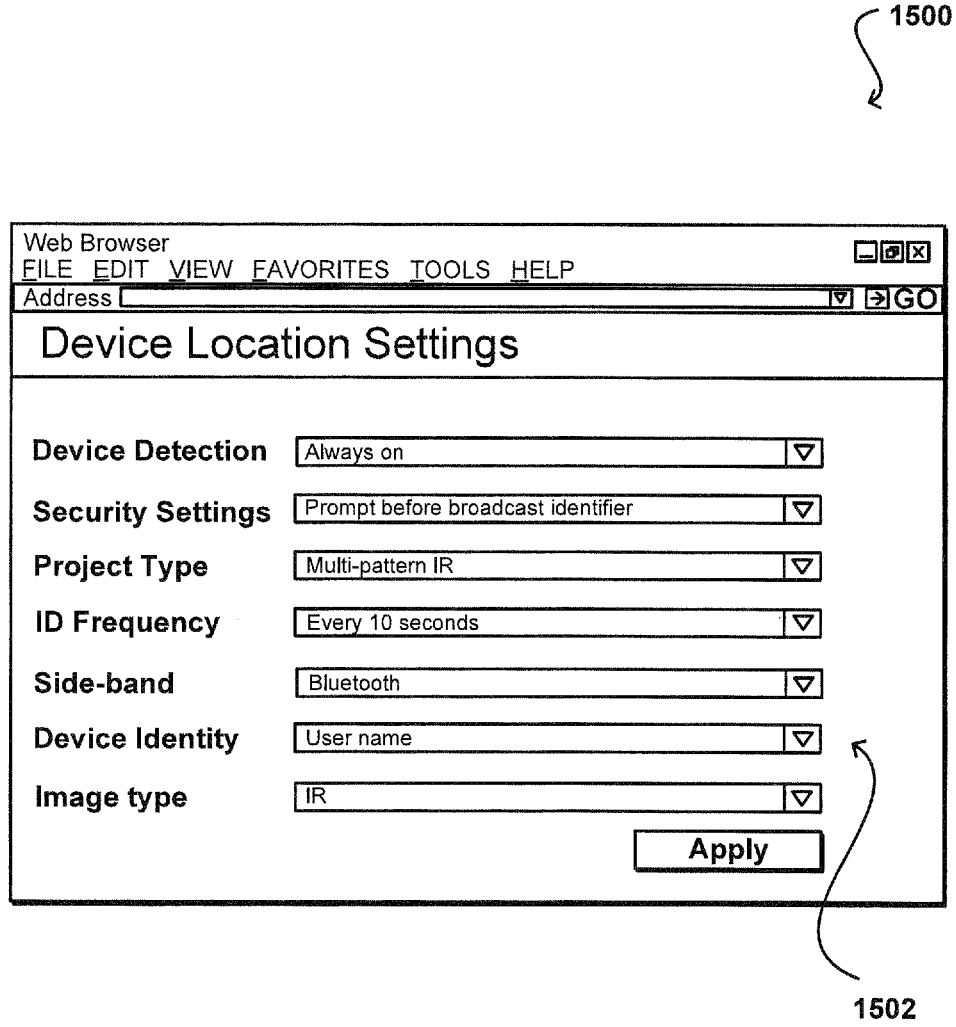
FIG. 15 illustrates an example configuration interface that can be used in accordance with various embodiments.

As mentioned above, a user can have the option or ability to control various aspects of position and/or identity determination processes as discussed herein. For example, a user can enable and/or configure a variety of inputs, outputs, and/or combinations thereof to be used with a computing device in accordance with various embodiments. For example, FIG. 15 illustrates an example interface 1500 wherein a user is presented with a variety of configurable options 1502. In this example the options are presented as drop-down boxes, but it should be understood that any other appropriate elements such as radio buttons, checkboxes, text boxes, or other such interface elements can be used as well within the scope of the various embodiments. In the example options displayed, a user is able to specify selections for device detection, such as always being active, not being active, or requiring manual activation. For active input, the user can specify security options such as whether to prompt the user before sending or accepting a communication to a detected device. Various other options can be specified as well, such as the type of projection to be used, how often to broadcast sideband or projected information, the type(s) of sideband channel to use, the identity to be projected, the type of image to be projected or captured, or any other appropriate information as would be apparent in light of the present disclosure.

As discussed, the ability to determine and track relative position between devices can be used for many other functions and purposes as well. For example, being able to determine and track the relative position and orientation of multiple devices enables those devices to act as controllers or other input mechanisms for a variety of gaming purposes. For example, a device can be used as a paddle or bat for a sporting game, or can be used with a throwing motion to play virtual catch. The user can point a device at a user and press a button to engage in a virtual water pistol fight, or swing the devices to engage in a virtual laser sword duel. In a game of cards, a user can flick the device towards the determined position of another user to deal a card to that user. Various other inputs that rely upon position and/or orientation can be used as well.

Figure 16:
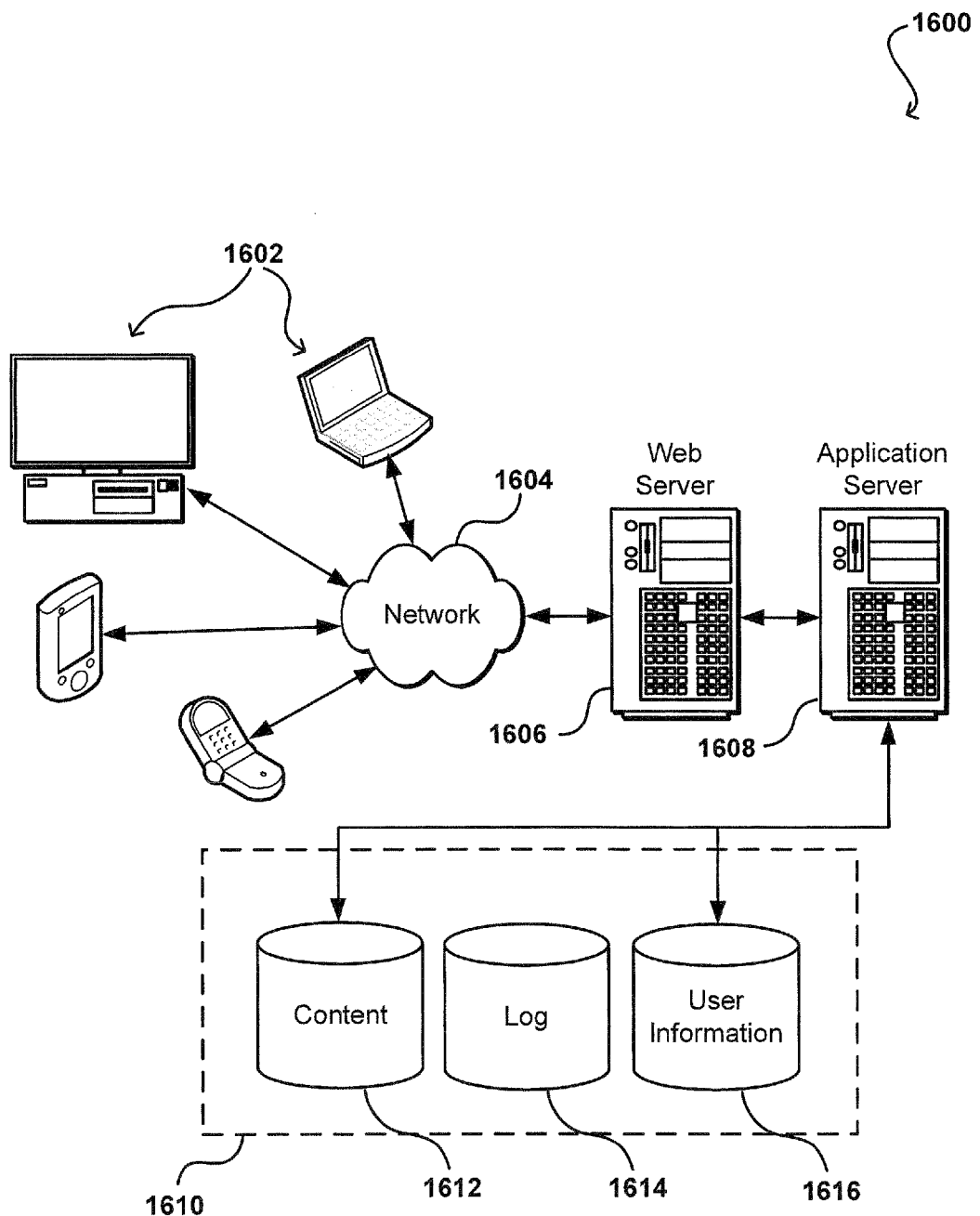
FIG. 16 illustrates an environment in which various embodiments can be implemented.

As discussed, different approaches can be implemented in various environments in accordance with the described embodiments. For example, FIG. 16 illustrates an example of an environment 1600 for implementing aspects in accordance with various embodiments. As will be appreciated, although a Web-based environment is used for purposes of explanation, different environments may be used, as appropriate, to implement various embodiments. The system includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1606 for receiving requests and serving content in response thereto, although for other networks an alternative device serving a similar purpose could be used, as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1602 and the application server 1608, can be handled by the Web server 1606. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing production data 1612 and user information 1616, which can be used to serve content for the production side. The data store also is shown to include a mechanism for storing log or session data 1614. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   one or more processors;
   a camera; and
   memory including instructions that, when executed by the one or more processors, cause the computing device to:
      capture at least one image including a representation of at least one object using the camera;
      determine first position information, relative to the at least one object, of the computing device by analyzing the at least one image;
      receive identity information and second position information, with respect to the at least one object, of a second computing device, the second computing device being positioned relative to the computing device such that the second computing device is outside a field of view of the camera, the identity information including at least one of a bar code, an alphanumeric identifier, a unique symbol, or a user-related image;
      determine an identity and a position, relative to the computing device, of the second computing device by analyzing the identity information, the first position information, and the second position information; and
      enable the computing device to interact with the second computing device based at least in part upon the position, relative to the computing device, of the second computing device.

2. The computing device of claim 1, wherein the instructions when executed further cause the computing device to:
   determine, by analyzing input data from one or more environment determination elements, that the computing device is unable to detect a projected identifier corresponding to the second computing device,
   wherein the one or more environment determination elements include at least one of an ambient light sensor, an infrared sensor, a sonic sensor, a microphone, an accelerometer, a gyroscope, a digital compass, or a global positioning system (GPS).

3. The computing device of claim 1, wherein the instructions when executed further cause the computing device to:
   generate a mapping of a respective position, relative to the computing device, of each of a plurality of computing devices within a detectable range of the computing device;
   display, on a display element of the computing device, respective identity information and the respective position, relative to the computing device, of each of the plurality of computing devices; and
   enable the computing device to interact with each of the plurality of computing devices based at least in part upon the respective position of each of the plurality of computing devices.

4. A computer-implemented method of identifying and determining a relative position of a computing device, comprising:
   under control of one or more computer systems configured with executable instructions,
      obtaining at least one image including a representation of at least one object;
      determining first position information of a first computing device relative to the at least one object using the at least one image;
      obtaining identity information and second position information of a second computing device relative to the at least one object, the second computing device positioned relative to the first computing device such that the second computing device is outside a field of view of one or more cameras of the first computing device;
      determining an identity and third position information of the second computing device relative to the first computing device based at least in part upon the identity information, the first position information, and the second position information; and
      enabling the first computing device to interact with the second computing device based at least in part upon the third position information.

5. The computer-implemented method of claim 4, further comprising:
   determining, based at least in part upon one or more environment determination elements, that the computing device is unable to detect a projected identifier corresponding to the second computing device.

6. The computer-implemented method of claim 5, wherein the one or more environment determination elements include at least one of a camera, an ambient light sensor, an infrared sensor, a sonic sensor, a microphone, an accelerometer, a gyroscope, a digital compass, or a GPS.

7. The computer-implemented method of claim 5, wherein the projected identifier is at least one of a bar code, an alphanumeric identifier, a unique symbol, or a user-related image.

8. The computer-implemented method of claim 4, wherein the identity and the third position information is obtained over at least one of a wireless data channel, radio frequency channel, Bluetooth channel, ultra wideband radio frequency channel, Wi-Fi channel, or infrared signaling channel.

9. The computer-implemented method of claim 4, wherein the identity and the third position information is obtained from at least one of the at least one object, the second computing device, or a remote server.

10. The computer-implemented method of claim 4, further comprising:
- generating a mapping of a respective position, relative to the computing device, of each of a plurality of computing devices within a detectable range of the computing device; and
- enabling the computing device to interact with each of the plurality of computing devices based at least in part upon the respective position of each of the plurality of computing devices.

11. The computer-implemented method of claim 10, further comprising:
- displaying, on a display element of the computing device, respective identity information and the respective position, relative to the computing device, of each of the plurality of computing devices.

12. The computer-implemented method of claim 4, further comprising:
- tracking a change in the position, relative to the computing device, of the second computing device,
- wherein the change in the position is determined by obtaining at least one additional image of a projected identifier corresponding to the second computing device.

13. The computer-implemented method of claim 4, further comprising:
- tracking a change in position, relative to the first computing device, of the second computing device,
- wherein the change in the position is determined by obtaining updated position information, relative to the first computing device, of the second computing device.

14. The computer-implemented method of claim 4, wherein the second computing device is positioned relative to the first computing device such that there is no line of sight between the first computing device and the second computing device.

15. A non-transitory computer-readable medium including instructions for identifying and determining a relative position of a computing device, the instructions when executed by one or more processors of the computing device causing the computing device to:
- obtain at least one image including a representation of at least one object;
- determine first position information, relative to the at least one object, of a first computing device based at least in part upon the at least one image;
- obtain identity information and second position information, relative to the at least one object, for a second computing device, the second computing device positioned relative to the first computing device such that the second computing device is outside a field of view of one or more cameras of the first computing device;
- determine an identity and third position information, relative to the first computing device, of the second computing device based at least in part upon the identity information, the first position information, and the second position information; and
- enable the first computing device to interact with the second computing device based at least in part upon the third position information.

16. The non-transitory computer-readable medium of claim 15, wherein the instructions when executed further cause the computing device to:
- track a change in a position, relative to the first computing device, of the second computing device,
- wherein the change in the position is determined by obtaining at least one additional image of a projected identifier corresponding to the second computing device.

17. The non-transitory computer-readable medium of claim 15, wherein the instructions when executed further cause the computing device to:
- track a change in a position, relative to the first computing device, of the second computing device,
- wherein the change in the position is determined by obtaining updated position information, relative to the first computing device, of the second computing device.

18. The non-transitory computer-readable medium of claim 15, wherein the instructions when executed further cause the computing device to:
- generate a mapping of a respective position, relative to the computing device, of each of a plurality of computing devices within a detectable range of the first computing device;
- display, on a display element of the first computing device, respective identity information and the respective position, relative to the first computing device, of each of the plurality of computing devices; and
- enable the first computing device to interact with each of the plurality of computing devices based at least in part upon the respective position of each of the plurality of computing devices.

* * * * *